United States Patent [19]

Kuze

[11] Patent Number: 5,033,865

[45] Date of Patent: Jul. 23, 1991

[54] THERMO-ACTUATOR

[76] Inventor: Yoshikazu Kuze, 31-3, Higashimagome 1-chome, Ohta-ku, Tokyo, Japan

[21] Appl. No.: 497,690

[22] Filed: Mar. 23, 1990

Related U.S. Application Data

[63] Continuation-in-part of Ser. No. 271,716, Nov. 16, 1988, abandoned.

[30] Foreign Application Priority Data

Nov. 24, 1987 [JP] Japan .................. 62-294178

[51] Int. Cl.$^5$ .................. G01K 11/06; G01K 5/48; G01K 5/00
[52] U.S. Cl. .................. 374/160; 60/527; 236/99 K; 236/101 C; 236/34; 236/34.5; 251/11; 374/187
[58] Field of Search .................. 374/160, 187, 201; 116/106, 207, 216, 217; 251/11; 236/101 C, 99 K, 34, 34.5; 60/527, 530

[56] References Cited

U.S. PATENT DOCUMENTS

| | | | |
|---|---|---|---|
| 3,080,756 | 3/1963 | Baker | 60/527 |
| 3,149,455 | 9/1964 | Daly et al. | 60/527 |
| 3,207,436 | 9/1965 | Jones | 236/34 |
| 3,231,194 | 1/1966 | Kuze | 236/34.5 |
| 3,308,668 | 3/1967 | Wong | 60/527 |
| 3,357,252 | 12/1967 | VErnet | 60/527 |
| 3,407,663 | 10/1968 | Vernet | 60/527 |
| 3,719,085 | 3/1973 | Sliger | 60/527 |
| 4,235,109 | 11/1980 | Williamson | 60/527 |
| 4,337,621 | 7/1982 | Lane, Jr. et al. | 251/11 |
| 4,441,317 | 4/1984 | Wolfe et al. | 60/527 |

Primary Examiner—William A. Cuchlinski, Jr.
Assistant Examiner—Diego F. F. Gutienez

[57] ABSTRACT

A thermo-actuator has a steel rod, a guide member slidably mounted on the rod, a spool seal secured to the guide member, a heat conductive cylinder secured to the guide member, and wax pellets provided in the cylinder. The spool seal has a thin layer, so that the spool seal engages with the rod by a vacuum generated in the spool seal. The thickness of the spool seal is between 5% to 25% of the diameter of the steel rod.

2 Claims, 5 Drawing Sheets

THERMO-ACTUATOR

This application is a continuation-in-part of application Ser. No. 07/271,716 filed on Nov. 16, 1988, now abandoned.

BACKGROUND OF THE INVENTION

The present invention relates to a thermoactuator provided in a wax-pellet thermostat for automotive engines and various thermo-sensors.

The thermo-actuator in the wax-pellet thermostat includes a steel rod, a guide member slidably engaged with the rod, a spool seal around the rod, a heat conductive cylinder secured to the guide member and exposed to a coolant, and wax pellets provided in the cylinder. The rod is sealed by a sealing device provided in the guide member.

When the temperature of the coolant rises in excess of a predetermined value of the thermostat, the wax expands. This forces the spool seal against the steel rod. As the wax squeezes the spool seal around the rod, the cylinder moves downward together with the guide member, thereby opening a valve. When the thermostat cools, the wax contracts, so that the spool seal expands.

On the other hand, the diaphragm portion of the spool seal at a central cylindrical portion has a relatively large thickness, for example, a thickness of 45% of the diameter of the rod. Accordingly, the restoring force of the spool seal to its original shape is very strong.

Accordingly, if the temperature of the coolant rapidly decreases from a high temperature (about 100° C.) to a low temperature (below 40° C.), the spool seal rapidly expands due to the restoring force of the spool seal to form a vacuum space between the spool seal and the rod. Thus, the coolant is inducted into the space by the vacuum.

Since the spool seal tightly grips the rod, the coolant in the space formed between the spool seal and the rod cannot be discharged. The valve is slightly raised by the coolant in the space, which causes the opening temperature of the valve to decrease. As a result, the engine is overcooled, thereby reducing the thermal efficiency of the engine and increasing the amount of emissions. The amount of the coolant in the space increases with time, so that the valve lift increases, which causes problems in the engine.

SUMMARY OF THE INVENTION

An object of the present invention is to provide a thermo-actuator, where a spool seal surrounding a rod has a thin wall for preventing the formation of a vacuum space between the spool seal and the rod.

Another object of the present invention is to provide a thermo-actuator which is small in size.

A further object of the present invention is to provide a thermo-actuator which is provided in automotive engines for preventing the engine from overcooling or overheating.

In the present invention, the thickness of the spool seal is 5% to 25% of the diameter of the steel rod. Thus, if the space between the spool seal and the rod becomes a vacuum, the inner wall of the spool seal tightly grips the rod by the vacuum, thereby preventing the coolant from entering into the spool completely.

Since the spool seal is extremely thin, the diameter of the cylinder can be reduced. If the size of the cylinder becomes small, the thickness of the wall of the cylinder can be reduced because of an increase in the durability of the cylinder. Thus, the thermo-actuator is compact in size and light-weight.

In the present invention, since the coolant is not entered into the spool seal, the valve lift does not change. Accordingly, the initial temperature of the valve can be increased and thermal efficiency of the engine can be increased thereby reducing the amount of emissions.

The applicant conducted pressure-resistance tests of the spool seal having an extremely thin wall member for the thermo-actuator of the present invention. The tests are conducted under the following conditions.

Pressure in the cylinder: zero to 90 kg/cm$^2$
Reciprocating stroke of the rod: 5 mm
Pressure application time: 4 seconds in one cycle If the test reaches 35,000 cycles over standard durability cycles of 20,000, any abnormalities may not be discovered.

In an example of the present invention, the diameter of the rod is 2.5 mm and the thickness of the spool seal is 0.3 mm, which is 1/3.5 times the size of the conventional thermo-actuator.

From the above-indicated test, it was confirmed that the spool seal having a thinner wall member was superior in durability. In the conventional spool seal having a thick wall member, in order to deform the spool seal to move the cylinder, excessive energy was consumed, so that the spool seal wears out fairly early due to the repeated fatigue from friction between molecules of the material of the spool and the steel rod.

The thermo-actuator of the present invention can be provided in a thermo-sensor, and results in the same benefits as described above, that is, the outside liquid is prevented from entering into the actuator.

According to the present invention, there is provided a thermo-actuator having a rod, a guide member slidably mounted on the rod, a spool seal secured to the guide member at an end portion thereof, a heat conductive cylinder secured to the guide member and surrounding the spool seal, and wax pellets provided in the cylinder. The seal has a thin wall member, so that the spool seal engages with the rod by a vacuum generated in the spool seal.

In one aspect of the present invention, the spool seal has a thickness between 5% and 25% of the diameter of the rod.

These and other objects and features of the present invention will become more apparent from the following description with reference to the accompanying drawings.

DETAILED DESCRIPTION OF THE PREFERRED EMBODIMENT

Figure 1:
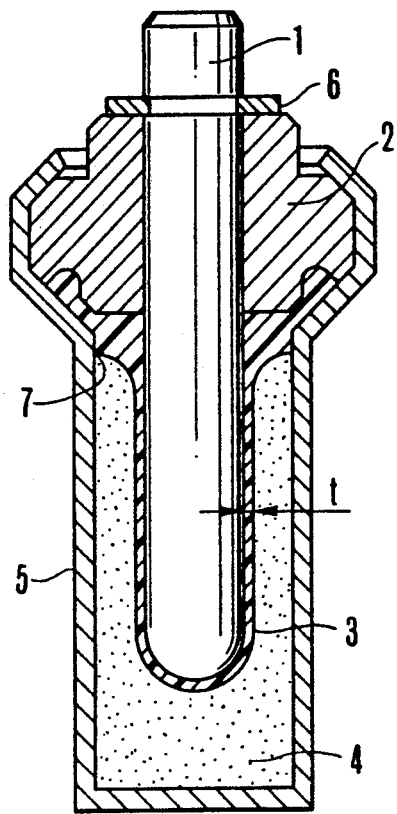
FIG. 1 is a sectional view of a thermo-actuator for a thermostat according to the present invention.

Referring to FIG. 1, a thermo-actuator of the present invention comprises a steel rod 1, a guide member 2 slidably engaged with the rod 1, a heat conductive cylinder 5 secured to the guide member 2, a spool seal 3 secured to the guide member 2, and wax pellets 4 provided in the cylinder 5. A snap ring 6 is engaged with the rod 1, for preventing the rod 1 from thrusting to the bottom of the spool 3.

Figure 2:
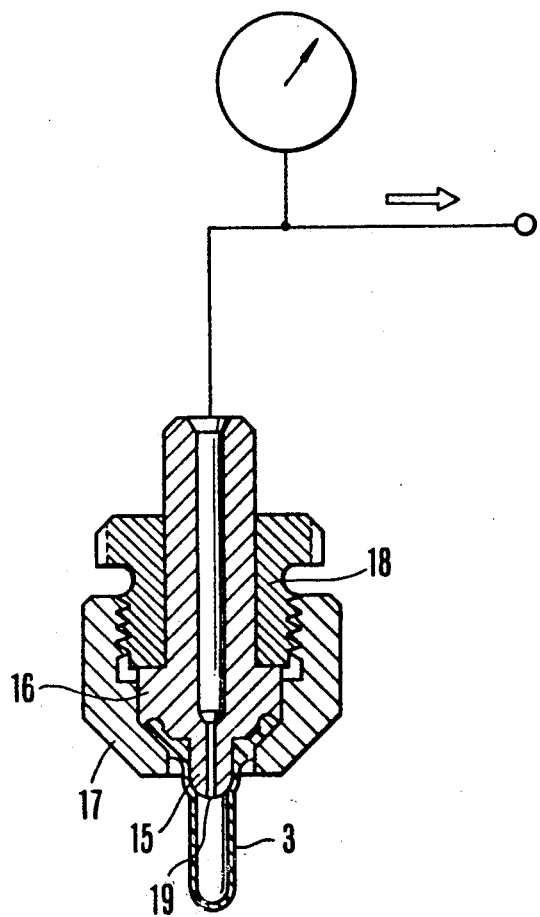
FIG. 2 shows a negative pressure test of a spool seal provided in the thermo-actuator.
Figure 3:
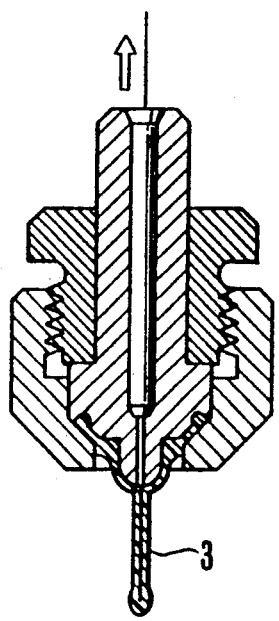
FIG. 3 is a side view of the spool seal of FIG. 2.
Figure 4:
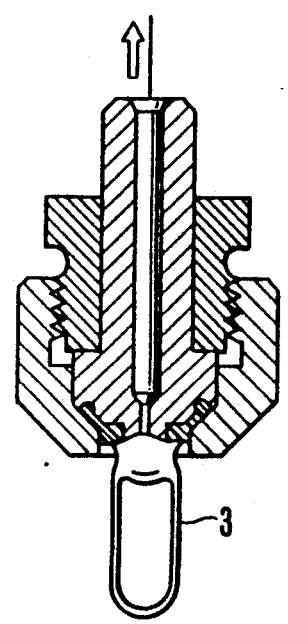
FIG. 4 is a front view of the same.

FIGS. 2 to 4 show the spool seal connected to a vacuum pump through a connector, for negative pressure tests.

The connector comprises a guide member 16 having a projection 15 which has the same size and shape as an end portion of the steel rod 1, a cap screw 17 engaged with a flange of the spool seal 3, and a screw 18 screwed in the cap screw 17 to grip the flange of the spool seal between the screw and the cap screw. The spool seal 3 communicates with the vacuum pump through a central hole 19 formed in the guide member 16.

The thickness (FIG. 1) of the central cylindrical portion of the spool seal is 12% of the diameter of the rod. When a negative pressure of 200 mmHg is applied, the spool is sucked so that the inner wall of the spool seal sticks to the projection 15 of the guide member 16. In this state, it will be understood that the outside liquid is prevented from entering into the spool seal. When a negative pressure of 350 mmHg is applied, the spool seal is entirely engaged with the projection 15.

As shown in FIG. 1, a skirt portion 7 of a base of the cylindrical portion of the spool seal adjacent the heat conductive cylinder is rounded in the shape of a horn. This shape is available for increasing the durability of the spool seal.

Figure 5:
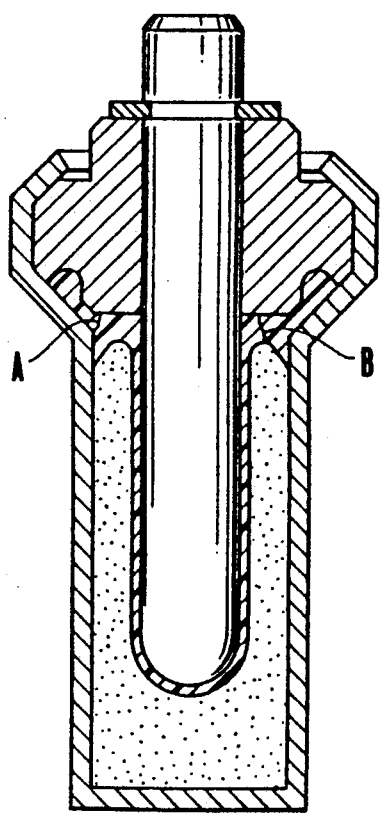
FIG. 5 is a sectional view of a conventional spool seal.

FIG. 5 shows a conventional spool seal where the base portion has a complicated shape so that cracks such as those shown at A and B occur.

Figure 6:
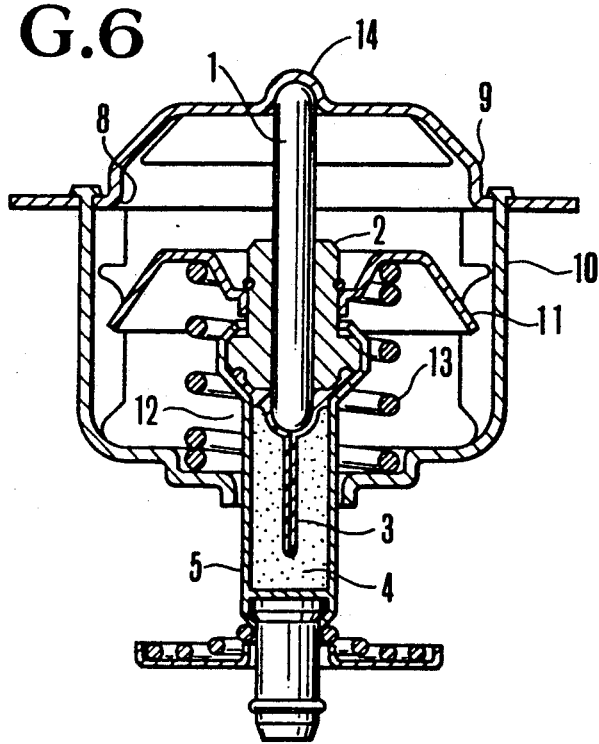
FIGS. 6 and 7 are sectional views of a thermostat of the present invention.
Figure 7:
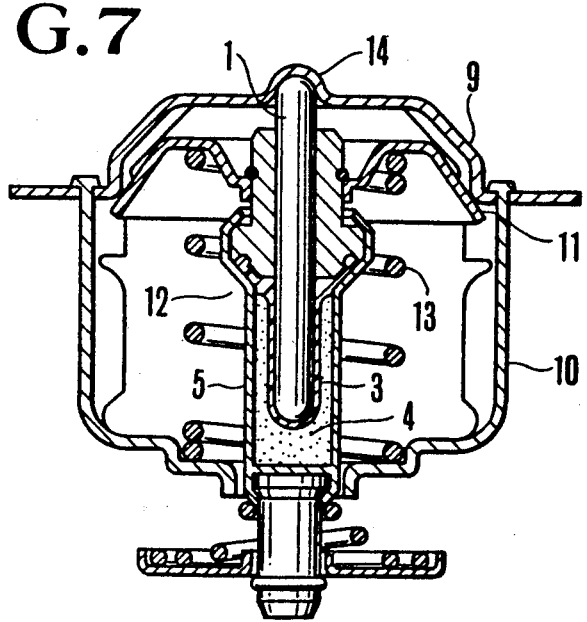

Referring to FIGS. 6 and 7, a thermostat to which the present invention is applied comprises a housing 9 forming a valve seat 8, and a frame 10 secured to the housing 9. The thermo-actuator 12 shown in FIG. 1 is mounted in the thermostat shown in FIGS. 6 and 7. The steel rod 1 is secured to the housing 9 at a top portion 14. A primary valve 11 is secured to the guide member 2. A return coil spring 13 disposed surrounding the cylinder 5 is provided between the primary valve 11 and the bottom of the frame 10.

FIG. 7 shows a valve in a closed state. When the temperature of the coolant rises in excess of a predetermined value of the thermostat, the wax pellets 4 expand. This forces the spool seal 3 against the steel rod 1. As the wax pellets 4 squeeze the spool seal 3 around the rod 1, the wax pellets 4 overcome the coil spring 13 and the thermo-actuator 12 moves downward, thereby opening the valve 11. When the thermostat cools, the wax pellets 4 contract. Then the coil spring 13 returns the valve to the closed position as shown in FIG. 7.

Figure 8:
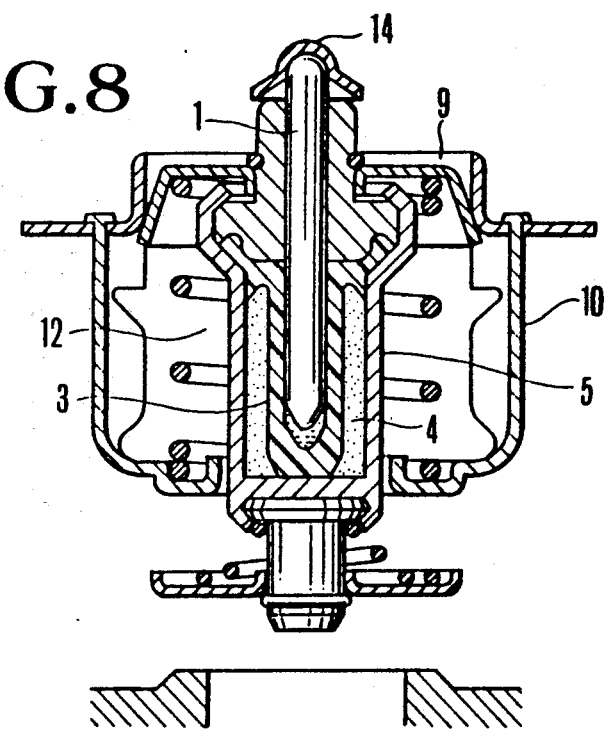
FIGS. 8 and 9 are sectional views of a conventional thermostat.
Figure 9:
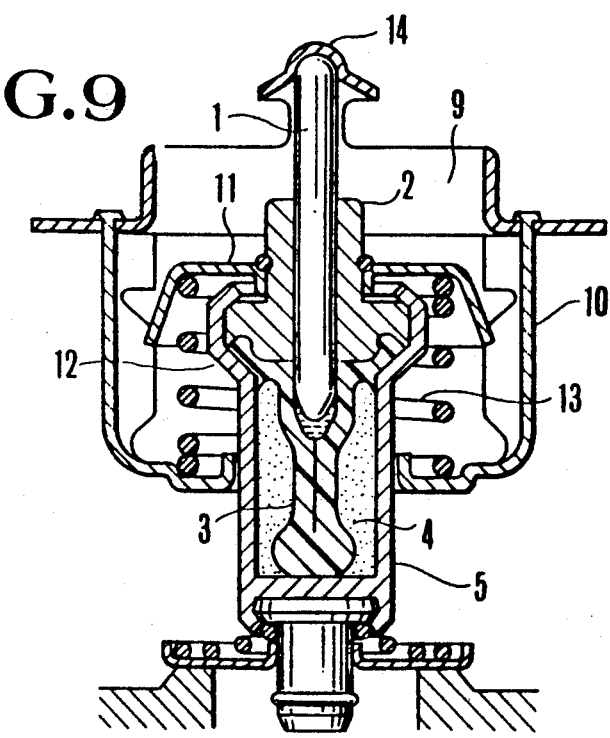
Figure 10:
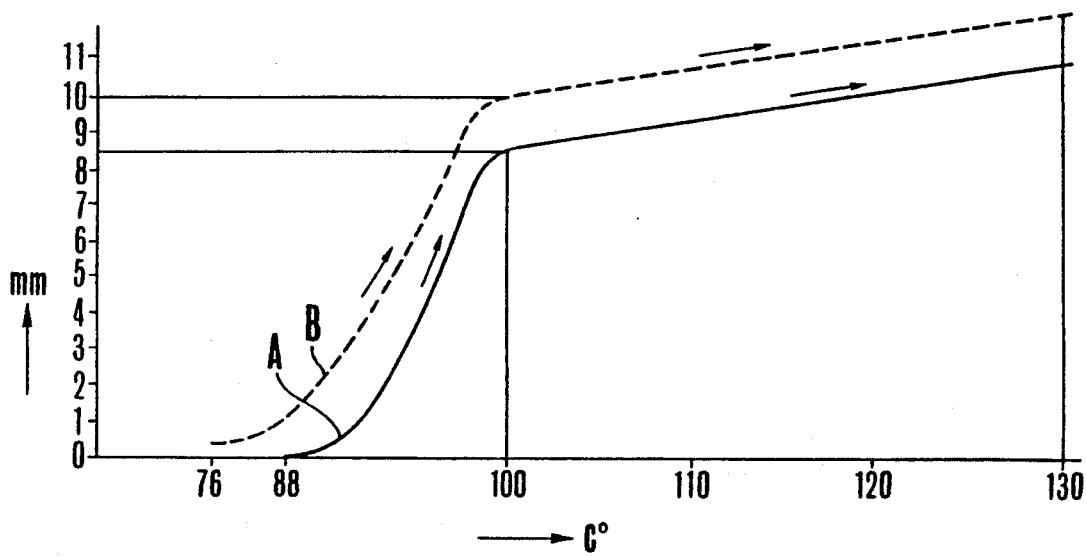
FIG. 10 is a graph showing valve lifts of the thermostat of the present invention and of conventional thermostats with respect to temperature.

FIGS. 8 and 9 show a conventional thermostat. A coolant is introduced into a space in the spool seal 3. FIG. 10 shows a valve lift (curve A) of the thermostat of the present invention shown in FIGS. 6 and 7 and a valve lift (curve B) of the thermostat shown in FIGS. 8 and 9.

The valve 11 of the thermostat of FIG. 9 in which the coolant is inducted in the spool seal 3 is fully opened at a temperature lower than that of the thermostat of the present invention shown in FIG. 6. Further, in the closing state, the valve 11 is not engaged with the valve seat 8, leaving a gap between the valve and the seat. Accordingly, the engine is overcooled.

Figure 11:
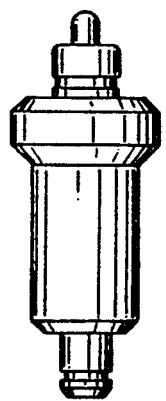
FIG. 11 is a side view of a conventional thermo-actuator.
Figure 12:
FIG. 12 is a side view of the thermo-actuator of the present invention shown at a relatively proportioned size to the thermo-actuator of FIG. 11.

FIG. 11 shows a conventional thermo-actuator and FIG. 12 shows a thermo-actuator of the present invention for the wax-pellet thermostat or for the thermo-sensor on the same scale as FIG. 11. It will be seen that the size of the thermo-actuator of the present invention is smaller than the conventional thermo-actuator.

While the invention has been described in conjunction with a preferred specific embodiment thereof, it will be understood that this description is intended to illustrate and not limit the scope of the invention, which is defined by the following claims.

What is claimed is:

1. A thermo-actuator comprising:
   a rod;
   a guide member slidably mounted on said rod;
   a spool seal secured to said guide member at an end portion thereof;
   a heat conductive cylinder secured to said guide member and surrounding said spool seal; and
   wax pellets provided within at least a portion of said cylinder;
   wherein said spool seal has a thickness between 5% to 25% of the diameter of said rod.

2. The thermo-actuator according to claim 1, wherein said spool seal includes a skirt portion having a horn shape at the base portion of a cylindrical portion of the spool seal adjacent said heat conductive cylinder.

* * * * *